United States Patent [19]
Hogarth

[11] 3,926,814
[45] Dec. 16, 1975

[54] HIGH MOISTURE MATERIAL DRAINAGE STRUCTURE AND METHOD

[75] Inventor: Robert E. Hogarth, Apopka, Fla.

[73] Assignee: A. O. Smith Harvestore Products, Inc., Arlington Heights, Ill.

[22] Filed: Apr. 24, 1974

[21] Appl. No.: 463,528

[52] U.S. Cl. .................... 210/323; 34/174; 52/197; 52/198
[51] Int. Cl.² ........................................ E04H 7/30
[58] Field of Search ........ 52/197, 198, 303; 210/83, 210/513, 314, 316, 318, 323; 426/489; 34/174

[56] References Cited
UNITED STATES PATENTS

| | | | |
|---|---|---|---|
| 2,292,876 | 8/1942 | Gladville | 52/198 |
| 2,410,338 | 10/1946 | Craine | 52/197 X |
| 2,551,216 | 5/1951 | Martin | 52/197 X |
| 3,035,739 | 5/1962 | Berg | 52/197 X |
| 3,071,061 | 1/1963 | Collins et al. | 52/197 X |
| 3,775,133 | 11/1973 | Batley, Jr. | 426/489 X |
| 3,855,799 | 12/1974 | Martin et al. | 61/11 |

*Primary Examiner*—Frank A. Spear, Jr.
*Assistant Examiner*—Robert G. Mukai
*Attorney, Agent, or Firm*—Andrus, Sceales, Starke & Sawall

[57] ABSTRACT

A tank confining high moisture material such as spent brewers grain and having a plurality of apertured pipes extending vertically along the inner wall of the tank and secured to the wall. The apertures in the pipes are vertically spaced and permit passage of liquid in the stored material into the pipes and flow of the liquid downwardly to a manifold for discharge from the tank. The method consists of utilizing the weight of the column of stored material to force the liquid to flow outwardly towards the wall of the tank and the tendency of such outward liquid flow because of the nature of the consistency of the high moisture material.

1 Claim, 5 Drawing Figures

HIGH MOISTURE MATERIAL DRAINAGE STRUCTURE AND METHOD

BACKGROUND OF THE INVENTION

High moisture materials such as spent brewers grain in order to be used for feed to animals needs to be dried, particularly when mixed with other forage material. This is normally done by heating the grain with gas or other fuel. This is an expensive procedure and requires the utilization of energy. The present invention is directed to a dewatering structure and method where no fuel is employed for dewatering the grain, and tons of the material can be dried at a considerably less cost than was possible before.

SUMMARY OF THE INVENTION

The invention is directed to a container and method for drying spent or wet brewers grain or other high moisture material such as citrus pulp or liquid manure. The container in general consists of a generally high tank, preferably of cylinder shape such as a silo. On the inside of the tank there are a plurality of circumferentially spaced vertically extending pipes secured to the wall of the tank. The pipes each extend from the top to the bottom of the tank and at the lower end each pipe rests in an elbow secured in the floor of the tank and which is connected to a manifold pipe which extends around the base of the tank. Each pipe has a plurality of vertically spaced apertures which extend from the upper end of the pipes to the bottom. When the brewers grain or other liquid saturated material is lodged within the tank, the liquid therein tends to flow outwardly toward the wall of the tank. This is due to the weight of the column of grain applying pressure to the grain stacked therein and the fact that with granular material the larger particles flow to the outside and the finer particles make up a generally dense core in the middle. The liquid in the material tends to run down the slope and through the coarser particles toward the wall of the structure. The liquid in the grain flows into the vertical pipes and thence downwardly and through the respective elbows to the manifold for discharge therefrom.

The method of the invention involves loading the moisture laden material into an elongated drainage structure and establishing a high column of the material inside the structure. Then utilizing the weight of the material in the column and the tendency because of the finer granules in the center of the column and larger ones located outwardly thereof to flow the liquid toward the wall of the tank. Thereafter the liquid is confined adjacent the wall and flowed downwardly for discharge from the bottom of the drainage structure. The drained material is then removed from the drainage structure.

Figure 1:
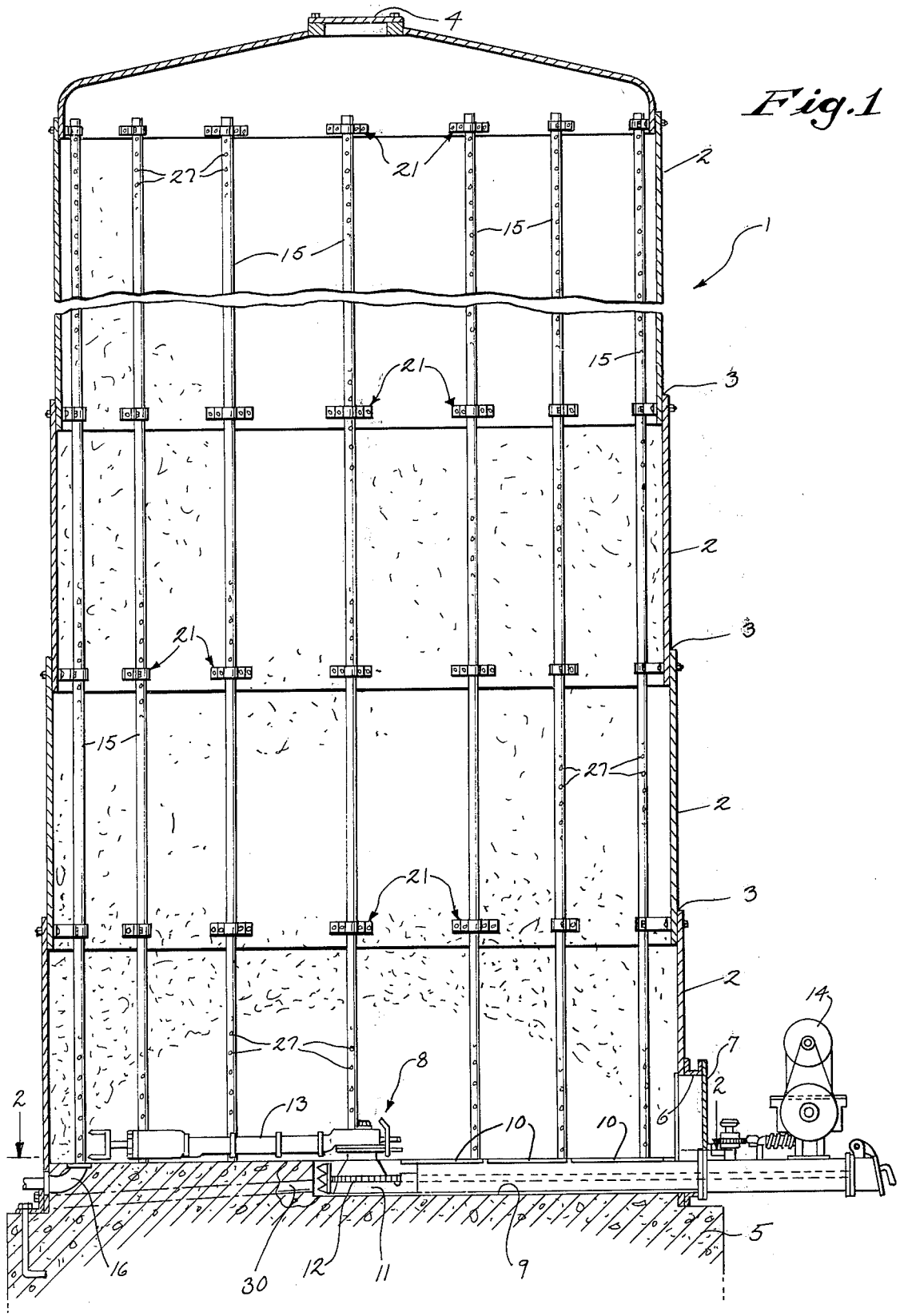
FIG. 1 is a vertical sectional view of a storage structure with a bottom unloader shown in elevation.

Referring to the drawings, there is shown a generally large upright tank or silo 1 of cylindrical shape which is formed from a plurality of steel sections 2 secured together at substantially liquid tight joints 3 and coated on the inside and outside with glass, not shown, to protect the steel from corrosion. Silo 1 is sealed at the joints to eliminate the entry of air and is ordinarily provided with a bag, not shown, such as disclosed in U.S. Pat. No. 3,193,058 to balance the pressures inside and outside the tank upon changes in temperature.

Silo 1 has an opening at the top through which the material, such as brewers grain, may be loaded into the silo. The opening is closed by the airtight cover 4 when material is not being loaded into the structure. The silo is secured to a foundation 5 preferably of concrete which also provides a floor for the structure. The lowermost cylindrical section 2 is provided with an opening 6 closed by door 7 for the insertion and withdrawal of a bottom unloader 8 within a trough 9 which extends in the concrete from the wall of the silo to substantially the center of the structure.

Trough 9 is covered by floor plates 10 which are spaced horizontally to open into the trough and leave a central opening 11 in trough 9.

The unloader 8 has an endless conveyor 12 located in trough 9 and a cutter arm 13 located above the floor of the foundation. The cutter arm 13 rotates around the bottom of the structure and is constructed to discharge material to the central opening 11 in the trough for discharge by the endless conveyor to the outside of the structure because the conveyor extends through door opening 6 to within a housing at the outside of tank 1.

Any suitable motive power such as motor 14 located on the housing outside silo 1 may be utilized through gearing, not shown, as it forms no part of the invention, to drive endless conveyor 12 and cutter arm 13 for discharge of the stored material from the bottom of the structure.

In order to drain saturated material loaded into silo 1, such as wet brewers grain, a plurality of thermoplastic resin pipes 15 are located vertically around the inside of silo 1 at circumferentially spaced locations. The pipes may be of polyvinyl chloride or other thermoplastic resin having rigidity and capable of withstanding the acids or other corrosive liquids to which pipes 15 may be subjected. Pipes 15 having a diameter of two inches have been found to be satisfactory, and the number of pipes employed will vary with the size of the silo. For example, in a silo having a diameter of nineteen feet, seven inches, it has been found that fourteen pipes do a satisfactory job of drainage of liquid from the stored material.

Pipes 15 extend from the top to the bottom of silo 1 and the lower end of each pipe terminates in a thermoplastic resin elbow 16 of material corresponding to the pipe material. Each elbow 16 is cast into the concrete floor of the silo and is flush or slightly below the floor of foundation 5. Each elbow 16 extends through the lower sheet 2 and is connected to a manifold 17 which extends around the base of silo 1 as may be observed in FIGS. 1 and 2 for flow of the liquid to the manifold 17 and discharge to a lagoon or the like by common drain line 18. Manifold 17 is constructed so that the pipes 15 and manifold can be drained and cleaned upon removal of plugs 19 from the outer end of the juncture between each pipe 15 and manifold 17. Elbows 16 have a greater diameter than pipes 15, and pipes 15 are not secured to the elbows. For example, pipes 15 may be two inches in diameter and the elbows 16 three inches in diameter. This leaves a space 20 around the lower end of each pipe 15 through which liquid can drain directly into each elbow from the floor or lower portion of silo 1.

Figures 3, 4, 5:
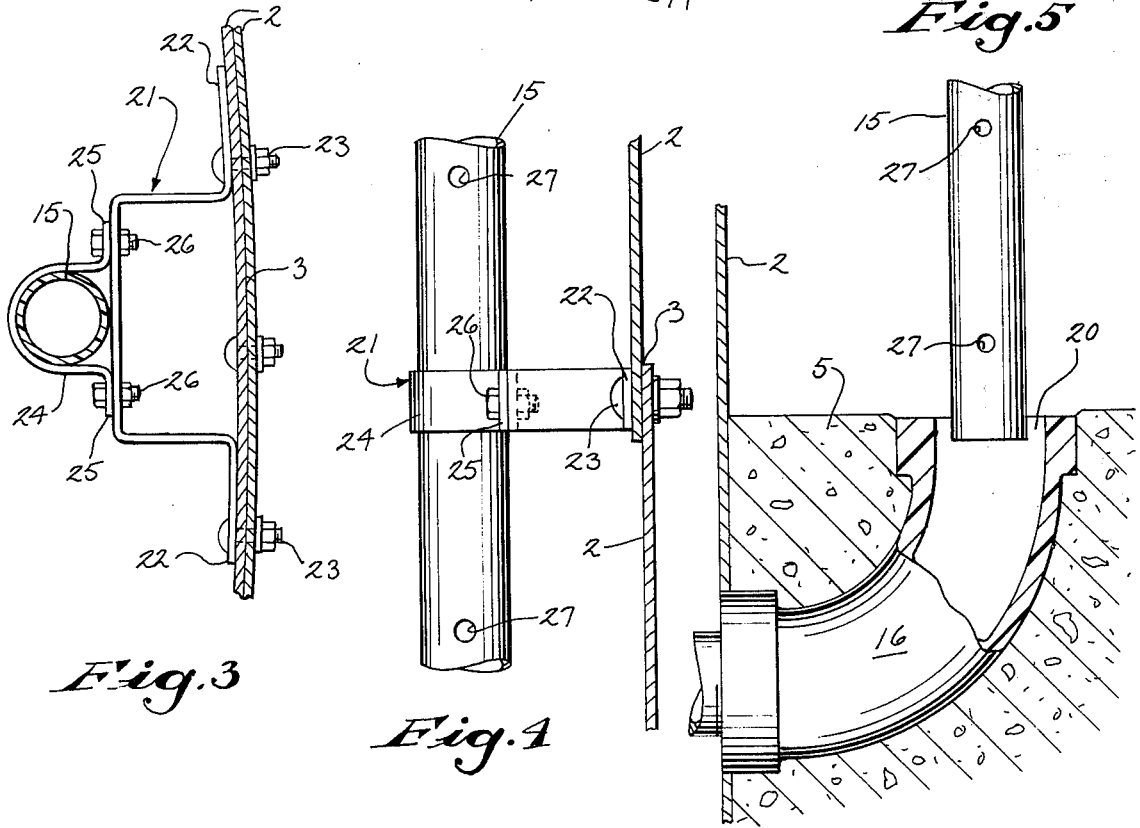
FIG. 3 is a detail view looking downwardly at the bracket construction for securing each pipe to the wall of the structure.
FIG. 4 is a side detail view of FIG. 3.
FIG. 5 is a detail view illustrating an elbow shown as receiving one of the pipes which is cast into the concrete of the foundation and floor and connected to the discharge manifold.

The attachment of pipes 15 to the wall of silo 1 in their vertical extent is illustrated by connection of one of the pipes 15 to the wall as shown in FIGS. 3 and 4. A reinforcing U-shaped bracket 21 is shown as secured to the wall of the tank at one of the joints 3. The flanges 22 of bracket 21 are bolted to the silo wall by bolts 23. The pipe 15 is held to the body of bracket 21 by the pipe guide 24 which encircles the outer circumference of pipe 15 and clamps the pipe against the body of bracket 21 when the respective flanges 25 of guide 24 are secured to bracket 21 by bolts 26. Various ways of holding the pipe to the wall of the tank may be employed. For example steel wire has been employed to hold the pipes flush with the wall by wiring the pipes to bolts at the joints between sections.

In order to effect passage of the liquid from the stored material and discharge from silo 1, pipes 15 are provided with a plurality of vertical spaced apertures 27 through which the liquid can pass and thence flow downwardly and through elbow 16 to manifold 17 for discharge. Experiments have indicated that apertures or holes 27 of ½ inch in diameter effect a satisfactory flow of liquid from the stored material into pipes 15.

Figure 2:
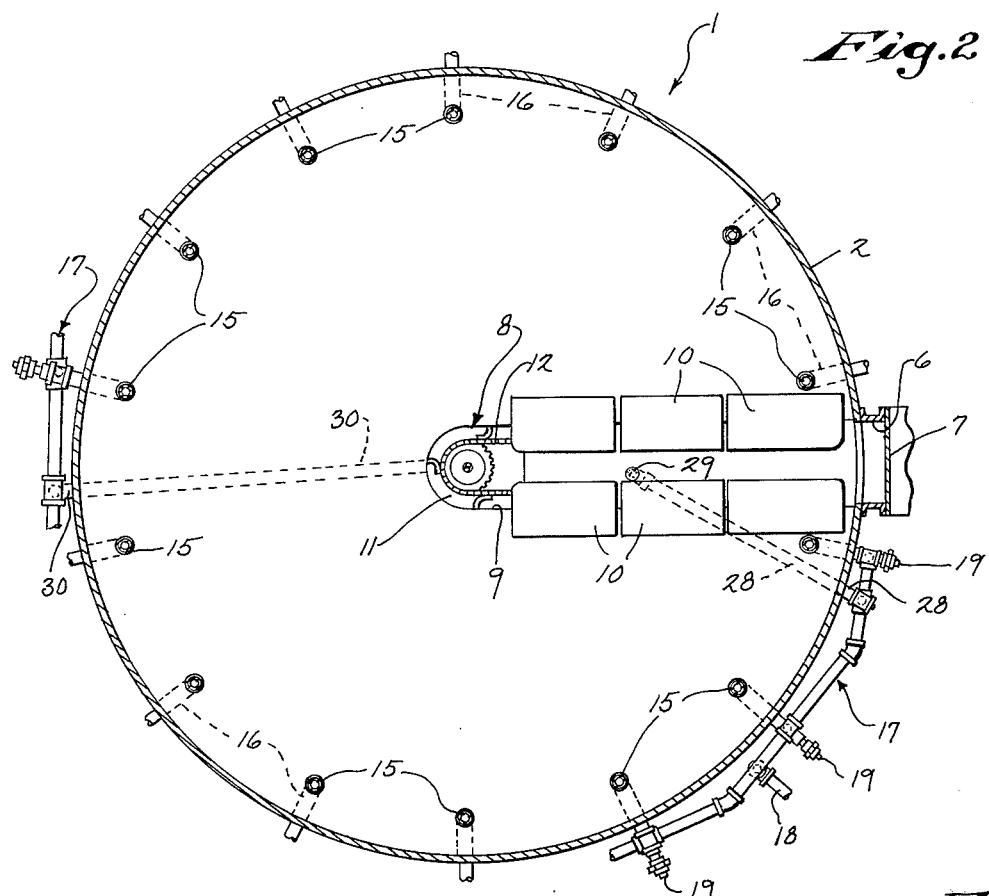
FIG. 2 is a section taken on line 2—2 of FIG. 1.

Besides the drainage of the stored material through pipes 15 and into elbows 16 additional drainage of liquid from the stored material may be effected at the bottom of the structure. This is illustrated in FIG. 2. There pipe 28 extends from a drain 29 in the bottom of trough 9 horizontally out through the lowermost section 2 of the silo and is connected to manifold 17. In addition, another pipe 30 is connected to the trough 9 at central opening 11 and extends horizontally through the lowermost section 2 substantially opposite to the extent of pipe 28 and is connected to manifold 17. Pipes 28 and 30 are of thermoplastic resin and of a diameter corresponding to that of manifold 17. A manifold 17 with a diameter of about 4 inches has been found to be satisfactory to receive the liquid discharged from pipes 15.

In the operation of the structure and the method of the invention, by way of example, spent brewers grain having about 85% moisture content is pumped into tank 1 through the opening in the top of the structure normally closed by the cover 4. The grain is built up inside the structure into a generally high column. As the grain is loaded into the structure, the larger particles flow to the outside of the column and the finer particles tend to build up a dense core of material in the middle of the column. When liquid flows into the structure with the material, it has been found that it tends to run down slopes in the column from the center core of finer material and through the coarser particles toward the wall of silo 1, thereby following the path of least resistance.

Combined with this tendency of the liquid to flow outwardly is the pressure of the column on the material stacked beneath the uppermost material. The pressure exerted on the lower material or grain tends to squeeze the liquid in it outwardly so that it can be collected along the wall of silo 1. As a result, the grain disposed adjacent the bottom of silo 1 feels the full effect of the pressure exerted by the weight of the column of material and is further relieved of its moisture content. By maintaining the column of material at a high level for most of the time the tank is in use even greater pressure can be applied to press the liquid from the material adjacent the bottom of the column.

Thus, it is possible to develop a continuous operation whereby dry grain is removed substantially continuously from the bottom of the structure and wet grain is loaded into the top.

A further feature of the drainage system of the invention is that the liquid in the stored grain flows from all levels of the column into pipes 15 because of the vertical, intermittent spacing of the apertures 27 so that the system is effective for draining the grain at all times throughout its passage throughout the silo. This is particularly important when wet grain may be placed on top of dried grain so that the dried grain will not be re-moisturized. Furthermore, by collecting the discharged liquid from manifold 17, the liquid can be preserved for later reconstituting or distilling it for other use rather than dissipating it as when grain, for example, is dried by heat.

Another feature of the invention is that the pipes are readily washed out after use to eliminate any deleterious deposits building up in pipes 15, elbows 16 and in manifold 17.

In some tests which have been made, it has been found that wet or spent brewers grain loaded into a structure of the invention has a saturated moisture content of about 85%. After passing through the system of the invention, grain taken from the bottom of a structure in which the perforated drainage pipes were used had in some tests a moisture content as low as 65%.

The drained brewers grain, upon unloading from the bottom of a drainage structure, is mixed with forage food for animals such as citrus pulp, other grain and supplements, to make up a final feed which has a moisture content of 45% to 55%.

Various modes of carrying out the invention are contemplated as being within the scope of the following claims particularly pointing out and distinctly claiming the subject matter which is regarded as the invention.

I claim:

1. In a container for the storage and drainage of high moisture material, a foundation providing a floor, a generally high tank having a metal wall secured to the foundation upon said floor and a normally closed opening at the top of the tank for entry of the material into the storage chamber provided by the tank, a plurality of circumferentially spaced thermoplastic drain pipes extending vertically of the inside of the wall of the tank for substantially the full heighth of the tank, means securing said pipes to said wall to be carried thereby, each of said pipes having vertically spaced apertures therein provided substantially from the top to the bottom of each pipe for the passage of liquid from the stored material into said pipes, a manifold extending around the tank at the bottom thereof, separate elbows at the bottom of the tank disposed to receive liquid from each of said vertical pipes, said elbows being cast in the foundation and extending substantailly flush with the top of the floor and connected to said manifold, and said elbows being of a greater diameter than the drain pipes and each drain pipe being freely received within an elbow and the diameter of each elbow being selected so that there is sufficient clearance for drainage liquid to pass from the lower portion of the tank but insufficient for silage to seep between each respective elbow and pipe.

* * * * *